United States Patent [19]

Yoshida et al.

[11] Patent Number: 5,059,338
[45] Date of Patent: Oct. 22, 1991

[54] WORKING FLUID

[75] Inventors: Yuji Yoshida, Itami; Koji Arita, Osaka; Takeshi Tomizawa, Ikoma, all of Japan

[73] Assignee: Matsushita Electric Industrial Co., Ltd., Osaka, Japan

[21] Appl. No.: 618,962

[22] Filed: Nov. 28, 1990

[30] Foreign Application Priority Data

Nov. 29, 1989 [JP] Japan .................................. 1-309644
Nov. 29, 1989 [JP] Japan .................................. 1-309670
Nov. 29, 1989 [JP] Japan .................................. 1-309671

[51] Int. Cl.$^5$ ............................................ C09K 5/04
[52] U.S. Cl. ........................................ 252/67; 62/114
[58] Field of Search .............. 252/67, DIG. 9; 62/114

[56] References Cited

U.S. PATENT DOCUMENTS

| | | | |
|---|---|---|---|
| 4,428,853 | 1/1984 | Ramet et al. | 252/67 |
| 4,680,939 | 7/1987 | Rojey et al. | 252/67 |
| 4,812,250 | 3/1989 | Ambrosino et al. | 252/67 |

FOREIGN PATENT DOCUMENTS

| | | |
|---|---|---|
| 0066439 | 12/1982 | European Pat. Off. . |
| 0272953 | 6/1988 | European Pat. Off. . |
| 0314978 | 5/1989 | European Pat. Off. . |
| 0315069 | 5/1989 | European Pat. Off. . |

*Primary Examiner*—Paul Lieberman
*Assistant Examiner*—Christine A. Skane
*Attorney, Agent, or Firm*—Wenderoth, Lind & Ponack

[57] ABSTRACT

A working fluid comprising trifluoromethane, chlorodifluoromethane and at least one halogenated ethane which consists of two carbon atoms, 1 or 2 hydrogen atoms, 0 to 2 chlorine atoms and balance of fluorine atoms and has a boiling point of not lower than −30° C. under atmospheric pressure, which has very small influence on the ozone layer in the stratosphere and is suitable as a substitute working fluid for dichlorodifluoromethane.

9 Claims, 5 Drawing Sheets

WORKING FLUID

BACKGROUND OF THE INVENTION

1. Field of the Invention

The present invention relates to a working fluid which comprises plural halogenated hydrocarbons and is used in refrigerators, heat pumps and the like.

2. Description of the Related Art

Hitherto, as working fluids in refrigerators, heat pumps and the like, are used halogenated hydrocarbons derived from methane or ethane, which are also called as fluorinated halocarbons. They work at such utilization temperature that a condensation temperature and/or an evaporation temperature are from about 0 (zero) to about 50° C. Among them, dichlorodifluoromethane ($CCl_2F_2$, R12) with a boiling point of $-29.8°$ C. is widely used as a working fluid in a refrigerator, an air conditioner for an automobile and a large size refrigeration system.

Recently, depletion of the ozone layer in the stratosphere with the fluorinated halocarbon is seriously discussed as one of global environmental problems, and amounts to be used and produced of some fully halogenated chlorofluorocarbons (CFCs) which have high ozone depletion potential are limited by the Montreal Protocol. In future, their use and production will be banned.

R12 has an ozone depletion potential (hereinafter referred to as "ODP") of 1.0 when ODP of trichlorofluoromethane ($CCl_3F$, R11) is defined to be 1 (one). The reduction of the use and production amount of R12 will have serious influence on human life since the refrigerators and the air conditioners are widely used. Therefore, it is highly desired to quickly develop a working fluid which has a small ODP and can be used as a substitute for R12.

SUMMARY OF THE INVENTION

An object of the present invention is to provide a working fluid which has less influence on the ozone layer in the stratosphere and can be used as a substitute for R12.

According to the present invention, there is provided a working fluid comprising trifluoromethane ($CHF_3$, R23), chlorodifluoromethane ($CHClF_2$, R22) and at least one halogenated ethane which consists of two carbon atoms, 1 or 2 hydrogen atoms, 0 to 2 chlorine atoms and balance of fluorine atoms (hereinafter referred to as "halogenated ethane derivative") and has a boiling point of not lower than $-30°$ C. under atmospheric pressure.

DETAILED DESCRIPTION OF THE INVENTION

Figure 1:
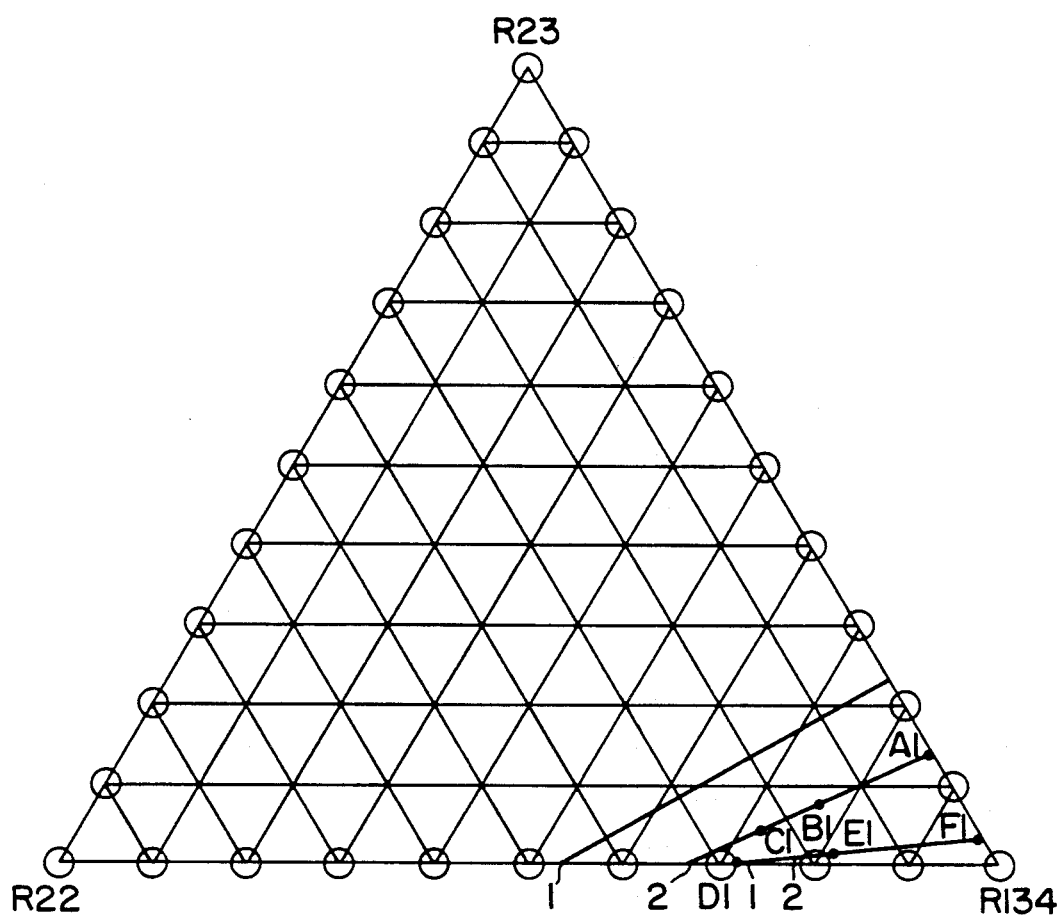
FIGS. 1 to 5 are ternary composition diagrams of the working fluids in Examples 1 to 5, respectively.

Among the components of the working fluid of the present invention, R23 has substantially no ozone depletion potential, namely its ODP is substantially zero and it contains no chlorine atom in its molecular structure. R22 has a very low ozone depletion potential, namely its ODP is only 0.05, and it contains both the hydrogen atom and the chlorine atom in its molecular structure. R23 and R22 are widely used as working fluids together with R12.

The halogenated ethane derivatives include fluorinated halocarbons having no chlorine atom in molecular structures and fluorinated halocarbons having chlorine and hydrogen atoms. It has substantially no or very low ozone depletion potential, no inflammability and low toxicity.

In particular, the halogenated ethane derivative having a boiling point of not lower than $-30°$ C. under atmospheric pressure is used in combination with R23 and R22, the working fluid of the present invention has a similar boiling point to that of R12. Among the halogenated ethane derivatives, tetrafluoroethane ($C_2H_2F_4$, ODP=0), chlorotetrafluoroethane ($C_2HClF_4$, ODP=0.02) or dichlorotrifluoroethane ($C_2HCl_2F_3$, ODP=0.02) is preferred.

A weight ratio of R23, R22 and the halogenated ethane derivative depends on the properties of the working fluid to be prepared and/or the kind of the halogenated ethane derivative. Usually, the working fluid of the present invention comprises 1 to 80% by weight of R23, 1 to 90% by weight of R22 and 10 to 95% by weight of the halogenated ethane derivative.

In one preferred embodiment, the working fluid of the present invention comprises 80% by weight or less (for example, 1 to 80% by weight) of R23, 90% by weight or less (for example 1 to 90% by weight) of R22, and 55 to 95% by weight of tetrafluoroethane or 40 to 95% by weight of chlorotetrafluoroethane or 10 to 95% by weight of dichlorotrifluoroethane, with the total amount being 100% by weight.

In a further preferred embodiment, the working fluid of the present invention comprises 65% by weight or less (for example, 1 to 65% by weight) of R23, 85% by weight or less (for example, 1 to 85% by weight) of R22, and 65 to 95% by weight of tetrafluoroethane or 50 to 95% by weight of chlorotetrafluoroethane or 15 to 90% by weight of dichlorotrifluoroethane, with the total amount being 100% by weight.

In one of more preferred embodiments, the working fluid of the present invention comprises 25% by weight or less (for example, 1 to 25% by weight) of R23, 45% by weight or less (for example, 1 to 45% by weight) of R22 and 55 to 95% by weight of tetrafluoroethane. In particular, the working fluid of the present invention comprises 15% by weight or less (for example, 1 to 15% by weight) of R23, 35% by weight or less (for example, 1 to 35% by weight) of R22 and 65 to 95% by weight of tetrafluoroethane.

In another one of more preferred embodiments, the working fluid of the present invention comprises 35% by weight or less (for example, 1 to 35% by weight) of R23, 60% by weight or less (for example, 1 to 60% by weight) of R22 and 40 to 95% by weight of chlorotetrafluoroethane. In particular, the working fluid of the present invention comprises 25% by weight or less (for example, 1 to 25% by weight) of R23, 50% by weight or less (for example, 1 to 50% by weight) of R22 and 50 to 95% by weight of chlorotetrafluoroethane.

In further one of more preferred embodiments, the working fluid of the present invention comprises 80% by weight or less (for example, 1 to 80% by weight) of R23, 90% by weight or less (for example, 1 to 90% by weight) of R22 and 10 to 95% by weight of dichlorotrifluoroethane. In particular, the working fluid of the present invention comprises 65% by weight or less (for example, 1 to 65% by weight) of R23, 85% by weight or less (for example, 1 to 85% by weight) of R22 and 15 to 90% by weight of dichlorotrifluoroethane.

The working fluid of the present invention comprises has much smaller influences on the ozone layer in the stratosphere than R12, since it comprises R23 which has substantially no ozone depletion potential (ODP=0) and contains no chlorine in the molecular structure, R22 which has a very low ozone depletion potential (ODP=0.05) and contains both the chlorine and hydrogen atoms in the molecular structure, and at least one halogenated ethane derivative which has a boiling point of not lower than $-30°$ C. under atmospheric pressure and substantially no ozone depletion potential (ODP=0) and contains no chlorine atom in the molecular structure, or has a very low ozone depletion potential and contains both the chlorine and hydrogen atoms.

In a specific composition range, the working fluid of the present invention has substantially the same vapor pressure as R12 in a temperature range between about 0° C. to about 50° C., and is suitable as a working fluid which can be used in presently used apparatuses as a substitute for R12.

The working fluid of the present invention is expected to have very small ODP, no flammability and little toxicity.

In addition, since the working fluid of the present invention is a non-azeotropic mixture and has a temperature gradient in the condensing and evaporating processes, a higher coefficient of performance (COP) than R12 is expected when Lorenz cycle in which a temperature difference from a heat source is decreased is assembled.

Since R23 has a low critical temperature (25.7° C.) and high vapor pressure, it alone cannot be used in the refrigerator or heat pump which is used in a utilization temperature range between about 0° C. and about 50° C. According to the present invention, by mixing R23 with R22 which has widely been used as a working fluid and at least one third fluorinated halocarbon having a lower vapor pressure, low ODP and no flammability, the vapor pressure of the mixture is substantially the same as that of R12, and the working fluid having low ODP and no flammability can be provided. This means that the working fluid does not include a mixture of R23, R22 and R142b as disclosed in U.S. Pat. No. 4,812,250 because of the presence of R142b having flammability.

PREFERRED EMBODIMENTS OF THE INVENTION

The present invention will be illustrated by following Examples.

Example 1

FIG. 1 shows a ternary composition diagram indicating equilibrium states of a mixture consisting of R23, R22 and 1,1,2,2-tetrafluoroethane (R134) at specific temperatures under specific pressure in a triangular coordinate.

In the triangular coordinate, in the counterclockwise direction from the top vertex, single compounds are assigned on the vertexes from a compound having the lowest boiling point to one having the highest boiling point. A composition (weight ratio) of the three compound at one point on the triangular coordinate is expressed by a ratio of distances between said point and the opposite sides. The distance between said point and the opposite side corresponds to a proportion of the compound which is assigned to the vertex which faces said side.

In FIG. 1, the lines 1 are phase equilibrium lines of the mixture at 0° C. under pressure of 2.116 kg/cm$^2$G. These temperature and pressure correspond to a saturated state of R12. The upper one of the phase equilibrium lines 1 (corresponding to R12 at 0° C.) is a saturated vapor line, and the lower one is a saturated liquid line. In the area between these two lines, the mixture is in the phase equilibrium state. The lines 2 are phase equilibrium lines of the mixture at 50° C. under pressure of 11.373 kg/cm$^2$G. These temperature and pressure correspond to a saturated state of R12.

If R23 alone is used, it exceeds the critical temperature at 50° C. However, the mixture has the saturated state so that it can be used in the refrigerator or heat pump which has the utilization temperature range between about 0° C. and about 50° C.

As understood from FIG. 1, the mixture comprising about 0 to about 25% by weight of R23, about 0 to about 45% by weight of R22 and about 55 to about 95% by weight of R134 is preferred, since it has substantially the same vapor pressure as R12 in the temperature range between about 0° C. and about 50° C. Further, the mixture comprising about 0 to about 15% by weight of R23, about 0 to about 35% by weight of R22 and about 65 to about 95% by weight of R134 is more preferred, since it has substantially the same vapor pressure as R12 at all the utilizing temperatures between 0° C. and 50° C.

The compositions and ODPs of the working fluids at the points A1 to F1 in FIG. 1 are shown in Table 1.

TABLE 1

| Point | A1 | B1 | C1 | D1 | E1 | F1 |
| --- | --- | --- | --- | --- | --- | --- |
| R23 (wt. %) | 13.9 | 7.3 | 4.1 | 0.1 | 1.3 | 3.6 |
| R22 (wt. %) | 0.9 | 16.3 | 23.8 | 28.5 | 17.6 | 0.6 |
| R134 (wt. %) | 85.2 | 76.4 | 72.1 | 71.4 | 81.1 | 95.8 |
| ODP | 0.001 | 0.008 | 0.012 | 0.014 | 0.009 | 0.001 |

The points A1, B1 and C1 are on the saturated vapor line of the phase equilibrium lines 2 (corresponding to R12 at 50° C.), and the point F1 is on the saturated liquid line of the phase equilibrium lines 2. Further, all of them are in the area between the saturated vapor line and the saturated liquid line of the phase equilibrium lines 1 (corresponding to R12 at 0° C.). Therefore, the mixture is in the phase equilibrium state at 0° C. under pressure of 2.116 kg/cm$^2$G which correspond to the saturated state of R12.

Since the points D1 and E1 are both on the saturated liquid line of the phase equilibrium lines 1 (corresponding to R12 at 0° C.) and in the area between the saturated vapor line and the saturated liquid line of the phase equilibrium lines 2 (corresponding to R12 at 50° C.), the mixture is in the phase equilibrium state at 50° C. under pressure of 11.373 kg/cm$^2$G which correspond to the equilibrium state of R12.

Then, the working fluid having the composition in Table 1 is in the saturated state or the phase equilibrium state under the saturated vapor pressure condition of R12 at 0° C. and 50° C., so that, in the utilization temperature range between about 0° C. and about 50° C., the working liquid has substantially the same condensation and evaporation temperatures as R12 when operated under the saturated vapor pressure of R12 at said temperatures.

In the above, the mixtures having the compositions on the phase equilibrium lines 1 (corresponding to R12 at 0° C.) or 2 (corresponding to R12 at 50° C.) have been explained. In addition, when working fluids having compositions in the area inside the points A1 to F1, namely those having compositions which realize the phase equilibrium states at 0° C. under pressure of 2.116 kg/cm²G and at 50° C. under pressure of 11.373 kg/cm²G both corresponding to the saturated state of R12 are operated in the similar way to the above, condensing and evaporation temperatures which are substantially the same as those of R12 can be achieved in the utilization temperature range between about 0° C. and about 50° C.

Accordingly, from FIG. 1, it is understood that the working fluid comprising about 0 to about 25% by weight of R23, about 0 to about 45% by weight of R22 and about 55 to about 95% by weight of tetrafluoroethane is preferred since it has substantially the same vapor pressure as R12 in the utilization temperature range between about 0° C. to about 50° C. Further, the working fluid comprising about 0 to about 15% by weight of R23, about 0 to about 35% by weight of R22 and about 65 to about 95% by weight of tetrafluoroethane is more preferred since it has substantially the same vapor pressure as R12 in the whole utilization temperature range between 0° C. to 50° C. The working fluids in this Example are expected to have the ODP of 0 to 0.02 and very promising as substitute working fluids to R12.

Example 2

Figure 2:
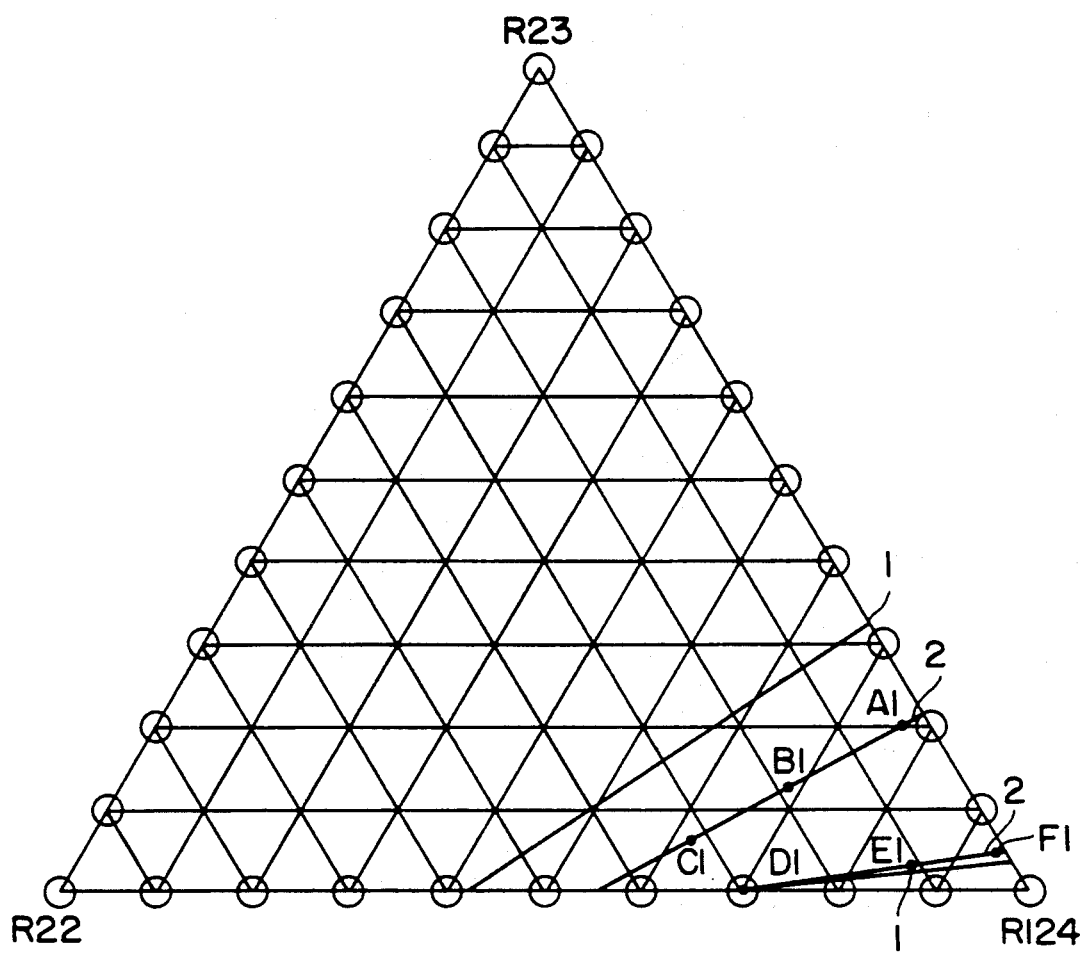

FIG. 2 shows a ternary composition diagram indicating equilibrium states of a mixture consisting of R23, R22 and 2-chloro-1,1,1,2-tetrafluoroethane (R124) at specific temperatures under specific pressure in a triangular coordinate. In FIG. 2, the lines 1 are phase equilibrium lines of the mixture at 0° C. under pressure of 2.116 kg/cm²G, and the lines 2 are phase equilibrium lines of the mixture at 50° C. under pressure of 11.373 kg/cm²G.

As understood from FIG. 2, the mixture comprising about 0 to about 35% by weight of R23, about 0 to about 60% by weight of R22 and about 40 to about 95% by weight of R124 is preferred, since it has substantially the same vapor pressure as R12 in the temperature range between about 0° C. and about 50° C. Further, the mixture comprising about 0 to about 20% by weight of R23, about 0 to about 45% by weight of R22 and about 55 to about 95% by weight of R124 is more preferred, since it has substantially the same vapor pressure as R12 at all the utilizing temperatures between 0° C. and 50° C.

The compositions and ODPs of the working fluids at the points A1 to F1 in FIG. 2 are shown in Table 2.

TABLE 2

| Point | A1 | B1 | C1 | D1 | E1 | F1 |
| --- | --- | --- | --- | --- | --- | --- |
| R23 (wt. %) | 20.8 | 12.6 | 6.3 | 0.5 | 2.9 | 4.8 |
| R22 (wt. %) | 1.2 | 18.4 | 31.6 | 29.1 | 11.5 | 0.7 |
| R124 (wt. %) | 78.0 | 69.0 | 62.1 | 70.4 | 85.6 | 94.5 |
| ODP | 0.016 | 0.023 | 0.028 | 0.029 | 0.023 | 0.019 |

The working fluid having the composition in Table 2 is in the saturated state or the phase equilibrium state under the saturated vapor pressure condition of R12 at 0° C. and 50° C., so that, in the utilization temperature range between about 0° C. and about 50° C., the working fluid has substantially the same condensation and evaporation temperatures as R12 when operated under the saturated vapor pressure of R12 at said temperatures.

Example 3

Figure 3:
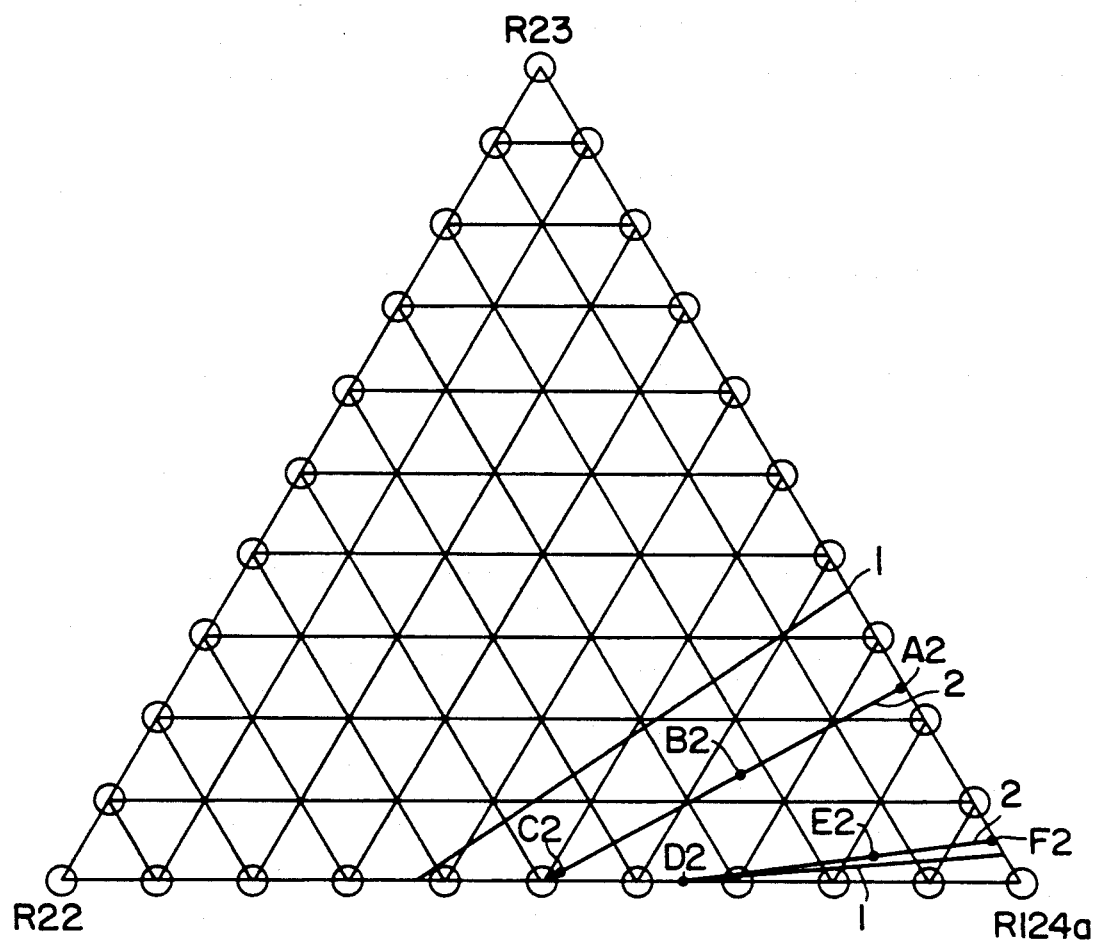

FIG. 3 shows a ternary composition diagram indicating equilibrium states of a mixture consisting of R23, R22 and 2-chloro-1,1,2,2-tetrafluoroethane (R124a) at specific temperatures under specific pressure in a triangular coordinate.

The compositions and ODPs of the working fluids at the points A1 to F1 in FIG. 3 are shown in Table 3.

TABLE 3

| Point | A1 | B1 | C1 | D1 | E1 | F1 |
| --- | --- | --- | --- | --- | --- | --- |
| R23 (wt. %) | 24.3 | 12.9 | 1.0 | 0.1 | 3.0 | 5.4 |
| R22 (wt. %) | 0.9 | 23.6 | 47.6 | 34.2 | 14.5 | 0.6 |
| R124a (wt. %) | 74.8 | 63.5 | 51.4 | 65.7 | 82.5 | 54.0 |
| ODP | 0.015 | 0.025 | 0.034 | 0.030 | 0.024 | 0.011 |

In this case, the mixture comprising about 0 to about 35% by weight of R23, about 0 to about 60% by weight of R22 and about 40 to about 95% by weight of R124a is preferred, and further, the mixture comprising about 0 to about 25% by weight of R23, about 0 to about 50% by weight of R22 and about 50 to about 95% by weight of R124a is more preferred.

As understood from FIGS. 2 and 3, the mixture comprising about 0 to about 35% by weight of R23, about 0 to about 60% by weight of R22 and about 40 to about 95% by weight of chlorotetrafluoroethane is preferred. Further, the mixture comprising about 0 to about 20% by weight of R23, about 0 to about 50% by weight of R22 and about 50 to about 95% by weight of chlorotetrafluoroethane is more preferred.

Since the working fluids in this Example are expected to have the ODP of from 0.02 to 0.04, they are very promising as substitute working fluids for R12.

Example 4

Figure 4:
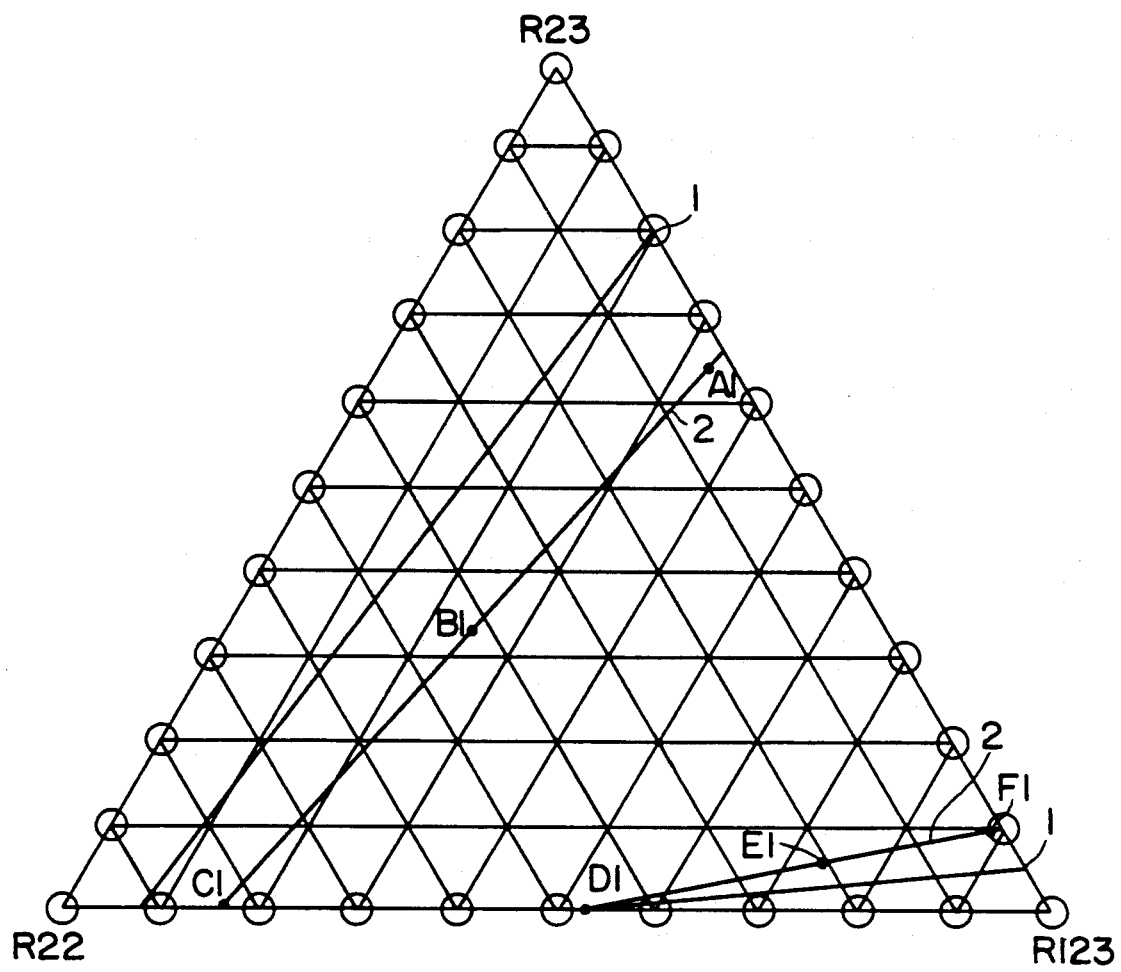

FIG. 4 shows a ternary composition diagram indicating equilibrium states of a mixture consisting of R23, R22 and 2,2-dichloro-1,1,1-trifluoroethane (R123) at specific temperatures under specific pressure in a triangular coordinate. In FIG. 4, the lines 1 are phase equilibrium lines of the mixture at 0° C. under pressure of 2.116 kg/cm²G, and the lines 2 are phase equilibrium lines of the mixture at 50° C. under pressure of 11.373 kg/cm²G.

As understood from FIG. 4, the mixture comprising about 0 to about 80% by weight of R23, about 0 to about 90% by weight of R22 and about 10 to about 95% by weight of R123 is preferred, since it has substantially the same vapor pressure as R12 in the temperature range between about 0° C. and about 50° C. Further, the mixture comprising about 0 to about 65% by weight of R23, about 0 to about 85% by weight of R22 and about 15 to about 90% by weight of R123 is more preferred, since it has substantially the same vapor pressure as R12 at all the utilizing temperatures between 0° C. and 50° C.

The compositions and ODPs of the working fluids at the points A1 to F1 in FIG. 4 are shown in Table 4.

TABLE 4

| Point | A1 | B1 | C1 | D1 | E1 | F1 |
| --- | --- | --- | --- | --- | --- | --- |
| R23 (wt. %) | 64.2 | 33.8 | 0.7 | 0.1 | 5.6 | 9.3 |
| R22 (wt. %) | 2.8 | 41.6 | 84.2 | 48.3 | 20.4 | 1.2 |
| R123 (wt. %) | 33.0 | 24.6 | 15.1 | 51.6 | 74.0 | 89.5 |

TABLE 4-continued

| Point | A1 | B1 | C1 | D1 | E1 | F1 |
|-------|-----|-----|-----|-----|-----|-----|
| ODP | 0.008 | 0.026 | 0.045 | 0.034 | 0.025 | 0.019 |

The working fluid having the composition in Table 4 is in the saturated state or the phase equilibrium state under the saturated vapor pressure condition of R12 at 0° C. and 50° C., so that, in the utilization temperature range between about 0° C. and about 50° C., the working fluid has substantially the same condensation and evaporation temperatures as R12 when operated under the saturated vapor pressure of R12 at said temperatures.

Example 5

Figure 5:
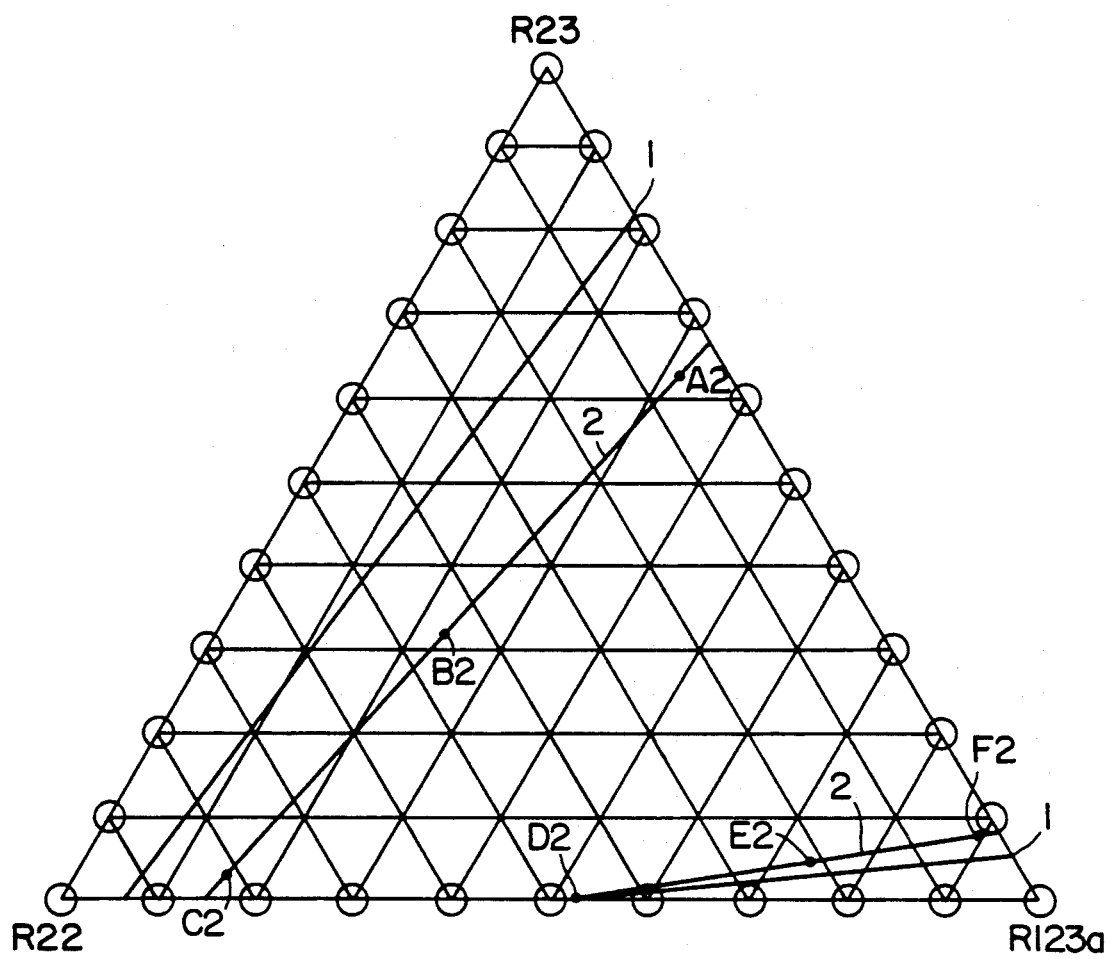

FIG. 5 shows a ternary composition diagram indicating equilibrium states of a mixture consisting of R23, R22 and 1,2-dichlorotrifluoroethane (R123a) at specific temperatures under specific pressure in a triangular coordinate.

The compositions and ODPs of the working fluids at the points A1 to F1 in FIG. 5 are shown in Table 5.

TABLE 5

| Point | A1 | B1 | C1 | D1 | E1 | F1 |
|-------|-----|-----|-----|-----|-----|-----|
| R23 (wt. %) | 62.5 | 31.4 | 2.9 | 0.5 | 4.8 | 8.0 |
| R22 (wt. %) | 6.4 | 45.6 | 81.8 | 45.3 | 21.8 | 2.7 |
| R123a (wt. %) | 31.1 | 23.0 | 15.4 | 54.2 | 73.4 | 89.3 |
| ODP | 0.009 | 0.027 | 0.044 | 0.033 | 0.026 | 0.019 |

In this case, the mixture comprising about 0 to about 80% by weight of R23, about 0 to about 90% by weight of R22 and about 10 to about 95% by weight of R123a is preferred, and further, the mixture comprising about 0 to about 65% by weight of R23, about 0 to about 85% by weight of R22 and about 15 to about 90% by weight of R123a is more preferred, since it has substantially the same vapor pressure as R12 at all the utilizing temperatures between 0° C. and 50° C.

As understood from FIGS. 4 and 5, the mixture comprising about 0 to about 80% by weight of R23, about 0 to about 90% by weight of R22 and about 10 to about 90% by weight of dichlorotrifluoroethane is preferred. Further, the mixture comprising about 0 to about 65% by weight of R23, about 0 to about 85% by weight of R22 and about 15 to about 90% by weight of dichlorotrifluoroethane is more preferred.

Since the working fluids in this Example are expected to have the ODP of from 0.01 to 0.04, they are very promising as substitute working fluids for R12.

From the above results, it is understood that the mixture comprising 80% by weight or less of R23, 90% by weight or less of R22, and 55 to 95% by weight of tetrafluoroethane or 40 to 95% by weight of chlorotetrafluoroethane or 10 to 95 by weight of dichlorotrifluoroethane is preferred. Further, the mixture comprising 65% by weight or less of R23, 85% by weight or less of R22, and 65 to 95% by weight of tetrafluoroethane or 50 to 95% by weight of chlorotetrafluoroethane or 15 to 95 by weight of dichlorotrifluoroethane is more preferred.

In above Examples, the mixtures contain three fluorinated halocarbons, although it is possible to mix four or more fluorinated halocarbons including structural isomers.

What is claimed is:

1. A working fluid comprising 1 to 80% by weight of trifluoromethane, 1 to 90% weight of chlorodifluoromethane and 10 to 95% by weight of at least one halogenated ethane which consists of two carbon atoms, 1 or 2 hydrogen atoms, 0 to 2 chlorine atoms and balance of fluorine atoms and has a boiling point of not lower than −30° C. under atmospheric pressure.

2. The working fluid as claimed in claim 1, which comprises 80% by weight or less of trifluoromethane, 90% by weight or less of chlorodifluoromethane, and 55 to 95% by weight of tetrafluoroethane or 40 to 95% by weight of chlorotetrafluoroethane or 10 to 95% by weight of dichlorotrifluoroethane, with the total amount being 100% by weight.

3. The working fluid as claimed in claim 1, which comprises 65% by weight or less of trifluoromethane, 85% by weight or less of chlorodifluoromethane, and 65 to 95% by weight of tetrafluoroethane or 50 to 95% by weight of chlorotetrafluoroethane or 15 to 90% by weight of dichlorotrifluoroethane, with the total amount being 100% by weight.

4. The working fluid as claimed in claim 1, which comprises 25% by weight or less of trifluoromethane, 45% by weight or less of chlorodifluoromethane and 55 to 95% by weight of tetrafluoroethane.

5. The working fluid as claimed in claim 4, which comprises 15% by weight or less of trifluoromethane, 35% by weight or less of chlorodifluoromethane and 65 to 95% by weight of tetrafluoroethane.

6. The working fluid as claimed in claim 1, which comprises 35% by weight or less of trifluoromethane, 60% by weight or less of chlorodifluoromethane and 40 to 95% by weight of chlorotetrafluoroethane.

7. The working fluid as claimed in claim 6, which comprises 25% by weight or less of trifluoromethane, 50% by weight or less of chlorodifluoromethane and 50 to 95% by weight of chlorotetrafluoroethane.

8. The working fluid as claimed in claim 1, which comprises 80% by weight or less of trifluoromethane, 90% by weight or less of chlorodifluoromethane and 10 to 95% by weight of dichlorotrifluoroethane.

9. The working fluid as claimed in claim 8, which comprises 65% by weight or less of trifluoromethane, 85% by weight or less of chlorodifluoromethane and 15 to 90% by weight of dichlorotrifluoroethane.

* * * * *